United States Patent
Halasz et al.

(10) Patent No.: US 7,464,410 B1
(45) Date of Patent: Dec. 9, 2008

(54) PROTECTION AGAINST FLOODING OF A SERVER

(75) Inventors: Sylvia Halasz, Fair Haven, NJ (US); Kamlesh T. Tewani, Freehold, NJ (US); David Tarjan, Fair Haven, NJ (US)

(73) Assignee: AT&T Corp., Bedminster, NJ (US)

( * ) Notice: Subject to any disclaimer, the term of this patent is extended or adjusted under 35 U.S.C. 154(b) by 548 days.

(21) Appl. No.: 10/013,569

(22) Filed: Dec. 11, 2001

Related U.S. Application Data

(63) Continuation-in-part of application No. 09/942,396, filed on Aug. 30, 2001.

(51) Int. Cl.
- G06F 11/00 (2006.01)
- G06F 12/14 (2006.01)
- G06F 12/16 (2006.01)
- G06F 15/18 (2006.01)
- G08B 23/00 (2006.01)

(52) U.S. Cl. .......................................... 726/23; 726/22
(58) Field of Classification Search ................. 713/200; 726/22, 23

See application file for complete search history.

(56) References Cited

U.S. PATENT DOCUMENTS

| | | | | |
|---|---|---|---|---|
| 5,524,099 A * | 6/1996 | Rickman et al. | ............... | 367/13 |
| 5,826,014 A * | 10/1998 | Coley et al. | .................... | 726/12 |
| 5,958,053 A * | 9/1999 | Denker | ........................ | 713/201 |
| 5,991,881 A * | 11/1999 | Conklin et al. | ............... | 713/201 |
| 6,026,442 A * | 2/2000 | Lewis et al. | ................... | 709/229 |
| 6,061,798 A * | 5/2000 | Coley et al. | ................... | 726/12 |
| 6,088,804 A * | 7/2000 | Hill et al. | ..................... | 713/201 |
| 6,119,236 A * | 9/2000 | Shipley | ........................ | 726/22 |
| 6,263,368 B1 * | 7/2001 | Martin | ........................ | 709/224 |
| 6,304,975 B1 * | 10/2001 | Shipley | ........................ | 726/22 |
| 6,321,338 B1 * | 11/2001 | Porras et al. | ................. | 713/201 |
| 6,405,318 B1 * | 6/2002 | Rowland | ...................... | 726/22 |
| 6,438,592 B1 * | 8/2002 | Killian | ........................ | 709/224 |
| 6,493,752 B1 * | 12/2002 | Lee et al. | ..................... | 709/223 |
| 6,697,824 B1 * | 2/2004 | Bowman-Amuah | ......... | 709/229 |
| 6,704,874 B1 * | 3/2004 | Porras et al. | ................... | 726/22 |
| 6,708,212 B2 * | 3/2004 | Porras et al. | ................. | 709/224 |
| 6,725,378 B1 * | 4/2004 | Schuba et al. | ................. | 726/13 |
| 6,738,814 B1 * | 5/2004 | Cox et al. | .................... | 709/225 |
| 6,751,668 B1 * | 6/2004 | Lin et al. | ..................... | 709/227 |
| 6,769,066 B1 * | 7/2004 | Botros et al. | .................. | 726/23 |
| 6,772,334 B1 * | 8/2004 | Glawitsch | .................... | 713/153 |
| 6,772,349 B1 * | 8/2004 | Martin et al. | ................. | 726/22 |
| 6,789,203 B1 * | 9/2004 | Belissent | ..................... | 726/22 |

(Continued)

OTHER PUBLICATIONS

Geng et al., Defeating distributed denial of service attacks, Jul.-Aug. 2000, IEEE, IT Professional, vol. 2, Issue 4, pp. 36-42.*

(Continued)

*Primary Examiner*—Nasser G Moazzami
*Assistant Examiner*—David García Cervetti

(57) ABSTRACT

A server on a packet network is protected from attack by flooding SYN messages that request a connection by comparing the number of SYN messages received within a preselected time interval N, where N is a number SYN messages within said preselected time that, with a predetermined probability, can be considered to be bona fide. When the number of received SYN messages within the preselected time interval is greater than N, corrective action is taken, such as discarding all SYN messages above the received N messages.

3 Claims, 2 Drawing Sheets

U.S. PATENT DOCUMENTS

| | | | |
|---|---|---|---|
| 6,816,910 B1* | 11/2004 | Ricciulli | 709/237 |
| 6,823,387 B1* | 11/2004 | Srinivas | 709/227 |
| 6,826,172 B1* | 11/2004 | Augart | 370/351 |
| 6,834,310 B2* | 12/2004 | Munger et al. | 709/232 |
| 6,851,062 B2* | 2/2005 | Hartmann et al. | 726/22 |
| 6,973,040 B1* | 12/2005 | Ricciulli | 370/241 |
| 6,983,380 B2* | 1/2006 | Ko | 706/12 |
| 7,051,369 B1* | 5/2006 | Baba | 726/23 |
| 7,114,182 B2* | 9/2006 | Robert et al. | 726/23 |
| 7,266,754 B2* | 9/2007 | Shah et al. | 714/776 |
| 2002/0031134 A1* | 3/2002 | Poletto et al. | 370/401 |
| 2002/0032774 A1* | 3/2002 | Kohler et al. | 709/225 |
| 2002/0032880 A1* | 3/2002 | Poletto et al. | 714/4 |
| 2002/0159387 A1* | 10/2002 | Allison et al. | 370/229 |
| 2002/0174208 A1* | 11/2002 | Morlitz | 709/223 |
| 2003/0051026 A1* | 3/2003 | Carter et al. | 709/224 |
| 2003/0074434 A1* | 4/2003 | Jason et al. | 709/223 |
| 2004/0221191 A1* | 11/2004 | Porras et al. | 714/4 |
| 2004/0257999 A1* | 12/2004 | MacIsaac | 370/252 |
| 2005/0039104 A1* | 2/2005 | Shah et al. | 714/776 |

OTHER PUBLICATIONS

McClure et al., Hacking Exposed: Network Security Secrets & Solutions, 1999, Computing Mcgraw-Hill, ISBN: 0072121270, pp. 346-350.*

Ferguson et al., Network Ingress Filtering: Defeating Denial of Service Attacks which employ IP Source Address Spoofing, May 2000, Network Working Group, RFC 2827.*

Schuba et al., Analysis of a denial of service attack on TCP, May 1997, Security and Privacy, 1997. Proceedings., 1997 IEEE Symposium on, pp. 208-223.*

Chen, Y.W., Study on the prevention of SYN flooding by using traffic policing, Apr. 2000, Network Operations and Management Symposium, 2000. NOMS 2000. 2000 IEEE/IFIP, pp. 593-604.*

Spatscheck et al., Defending against denial of service attacks in Scout, Feb. 1999, Operating Systems Design and Implementation Proceedings of the third symposium on Operating systems design and implementation, ACM, pp. 59-72.*

* cited by examiner

PROTECTION AGAINST FLOODING OF A SERVER

RELATED APPLICATION

This is a continuation-in-part of an application titled "A Method and System for Statistically Based Protection of Host Device From Flood Attacks," bearing the Ser. No. 09/942,396, filed Aug. 30, 2001, which is hereby incorporated by reference in its entirety.

BACKGROUND

This invention relates to enhancing the protection of a host computer from network disruptions, and more particularly, to a method for enhancing the protection of a server from flooding attacks via a telecommunication network.

The Internet has become an integral part of today's society, with practically innumerable number of consumers using it to search for information, get news, purchase products on-line, locate special events, pay bills, perform on-line banking, etc. The Internet is a worldwide network of server computers that are accessible through a packet-carrying telecommunications network, a standardized protocol, and an established naming space. More specifically, communication of data over the Internet takes place via a Transmission Control Protocol/Internet Protocol (TCP/IP) that was created in the early 1970's and has evolved into a transport protocol to conduct all kinds of electronic transactions. Numerous of the servers on the Internet are sites of commercial establishments, where products or services of the business establishments are offered to client computers that connect to the servers. The product-purchase or service purchase interactions between such Internet site servers and the client computers, which are typically personal computers of individuals that connect to the Internet via an Internet Service Provider, are sometimes referred to as e-commerce.

For all its versatility, the TCP/IP protocol leaves devices that are connected to the Internet vulnerable to computer-hacker denial-of-service (DoS) attacks. A DoS attack overloads the victimized server, thereby denying users access to the server and causing loss of revenue to the owner of the victimized server. A common DoS attack is a "SYN attack," which occurs in the course of the conventional three-message handshake operation used for starting a data connection between two devices (i.e., the client and the server). In accordance with the conventional connection establishment protocol, a client wishing to connect to a server sends a "synchronize" (SYN) message to the server. The SYN message includes the IP address of the client wishing to establish a connection (in addition to other signals). In response, the server sends a "synchronize and acknowledge" (SYN/ACK) message to the client, and finally, the client sends an "acknowledge" (ACK) message to the server. After the three-message handshake is completed, the client and server switch to a data transfer/connection mode to send and receive application(s) data.

As the protocol relates to the server, a problem exists if the client sends a SYN message but fails to send the ACK message in response to the SYN/ACK message from the server. To overcome this problem, the server includes a timer that is initiated when the SYN/ACK message is sent. If an ACK message does not arrive at the server before the timer expires, the server abandons the requested connection (moving the connection to a "closed" state). A DoS condition results when a hacker client sends a large number of SYN messages to the server (floods the server) and intentionally refrains from sending the ACK messages. When that occurs, the server is continually waiting for the ACK message from each connection establishment request, becomes swamped with connection establishment requests, and basically becomes paralyzed.

The aforementioned parent application overcomes this problem by providing a system and method of predicting and protecting a server from a flooding attack. In accordance with one aspect of the disclosed solution, the arrival times of SYN messages (requesting connections) are maintained. The difference in arrival times between adjacent SYN message arrival times from the same device are calculated and compared to a threshold. If the compared arrival times are within the threshold, the second connection is refused (ignored). The threshold value is selected based on a probability distribution function—established after extensive study of the arrival times of previous connection establishment requests received at the server.

This solution is very good, but it still is open to attack from a hacker who is able to mask the true IP address of the client that is requesting connection establishment through its SYN messages. By sending a flood of SYN messages with different originating (bogus) IP addresses, the server can still be brought down.

SUMMARY

A solution to the above-described problem is achieved with a system and method that controls the number of connection establishment requests that are accepted for processing. The method compares the arrival times of SYN messages that request a connection without regard to the IP address of the source client that sent the SYN message, or messages. Specifically, in accord with the method disclosed herein, the number of SYN messages within a preselected time interval T is ascertained, and compared to a predetermined number, N. When the number of SYN messages within period T is greater than N, it is concluded that the server is under a flooding attack, and appropriate action is taken. This action can be, for example, ignoring all SYN messages within the T interval in excess of N.

DETAILED DESCRIPTION

Figure 1:
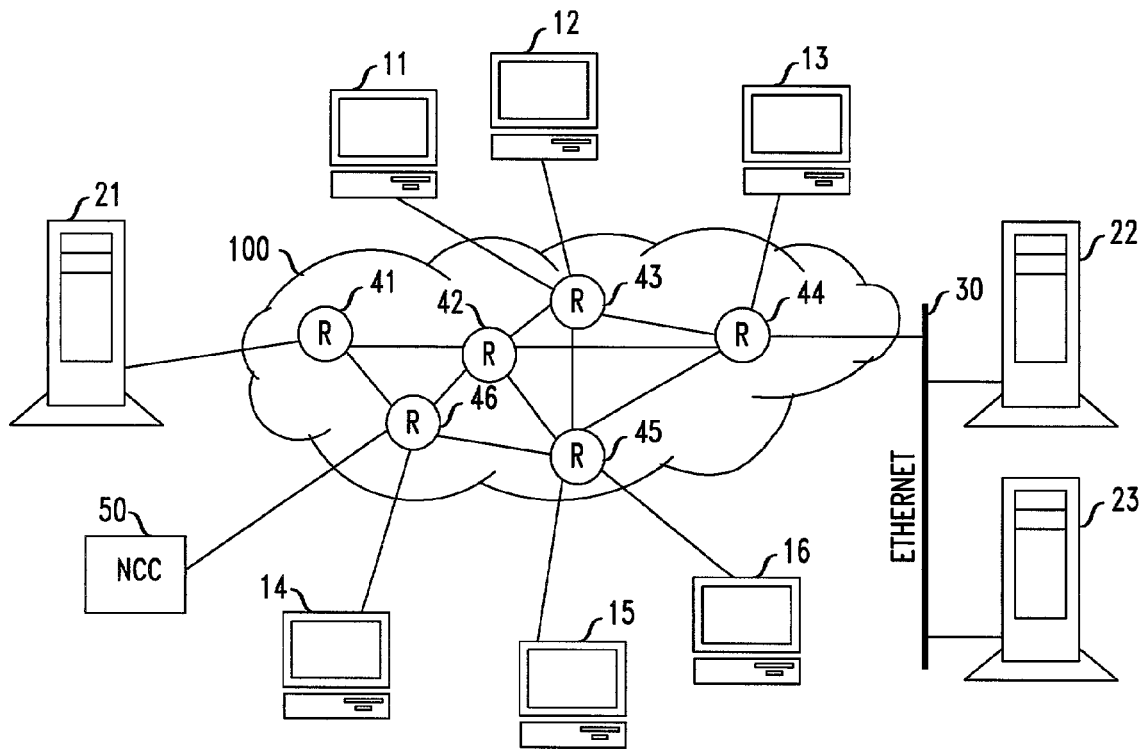
FIG. 1 is a schematic diagram of a telecommunication network environment in which an embodiment of the present invention may be implemented.

FIG. 1 presents a high-level system diagram of a packet network 100, for example, the Internet, which includes network devices 41 through 46 that are interconnected by packet-carrying links. Devices 41 through 46 include a routing function and, for that reason, they are designated by the letter "R" in FIG. 1. The network includes a Network Control Center (NCC) 50 that is coupled to one of the network devices. A plurality of client computers 11 through 16 are also connected to various ones of the network devices, as well as a plurality of servers 21, 22, and 23. For illustrative purposes, the FIG. 1 arrangement includes an Ethernet local area network 30 that is connected to network device 44, and servers 22 and 23 are connected to network device 44 via the local area network 30. The term "node" is used herein to represent both a network device and a server.

Under normal circumstances, any one of the clients may establish a connection with any one of the servers by, as described above, sending a SYN message to a selected server, the server receiving the SYN message responding with an ACK/SYN message, and the client acknowledging receipt of the server's transmission with an ACK message. If, for example, client 15 floods server 22 with SYN messages but refuses to acknowledge any ACK/SY returning messages from server 22, then server 22 can become effectively not operational. As long as the SYN messages of client 15 have the same IP address, for example of the true IP address of client 15, then DoS can be forestalled in server 22 by the method disclosed in the aforementioned Ser. No. 09/942,396 patent application. However, if the hacker at client 15 is able to alter the IP address that its SYN message(s) carry to server 22, the method disclosed in the aforementioned Ser. No. 09/942,396 patent application fails to prevent DoS.

The probability that more than a given number of connection establishment requests arrive within a given, very short, time period, T, to a given IP address, e.g., server 22, can be estimated for a given network after extensive studies. From this, an upper bound N can be calculated for the number of bona fide connection establishment requests within a time interval T.

The specific probability distribution can be a fixed distribution that is assumed to be valid for all networks. Alternatively, the probability distribution can be a fixed distribution that is determined to be valid for the particular network 100, which may be different from the distribution in other packet networks. Alternatively still, the probability distribution can be a fixed distribution that is determined to be valid for the particular server (e.g. 22) in the particular network 100. Lastly, the probability distribution can be adjustable, based on the SYN messages experience of the server. Whichever way a probability distribution is employed, a number N is selected based on the probability distribution employed that results in a rejection rate that is acceptably small for bona fide SYN messages that request a connection.

Figure 2:
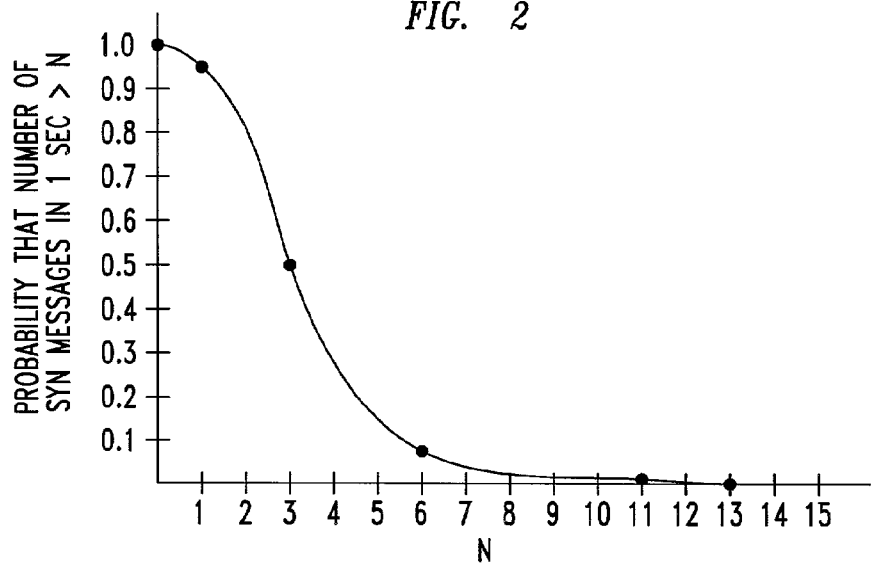
FIG. 2 shows the experimentally obtained probability of the maximum number of valid connection requests in a second.

FIG. 2 presents a probability distribution that was obtained from 8.5 hours of data collection from traffic on an intranet of a large international company. Five hundred thousand random intervals of 1-second length (T) were taken, and counted for each destination IP address. Based on data so collected, we arrived at the probability distribution shown in FIG. 2, and for this probability distribution, it appears that a choice of N=14, for T=1 represents a pretty good choice, since 13 was the maximum number of bona fide SYN requests that occurred in the 1-second interval; and that occurred only once in the 500,000 random intervals. Stated in other words, with a choice of T=1 second and N=14, the probability of wrongfully refusing to service a SYN message requesting a connection is less than 1 in 500,000.

Figure 3:
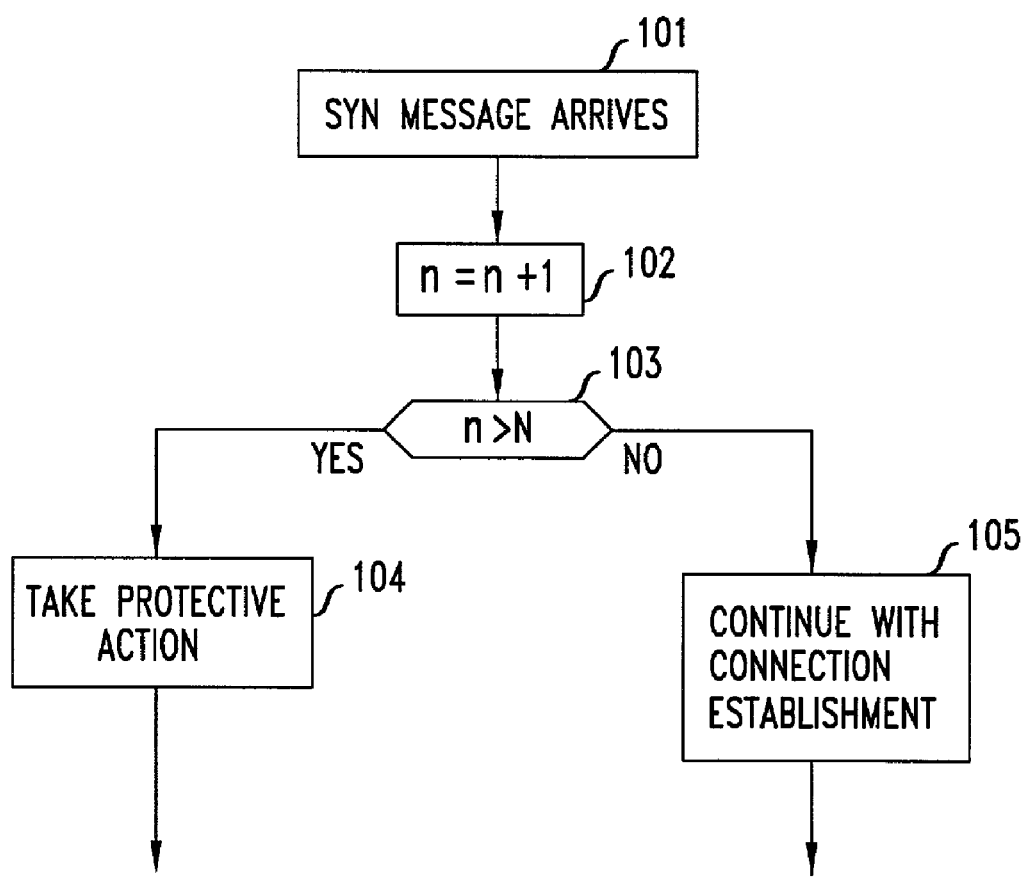
FIG. 3 is a flowchart of a method in conformance with the principles disclosed herein.

The method of this invention, which may be practiced within each of the servers or the network elements (i.e., node), is depicted in FIG. 3. For purposes of the FIG. 3 method, the values of T and N are preselected, for example, T=1 and N=14. When a SYN message arrives at the server in step 101, control passes to step 102 where a SYN messages counter is incremented. This counter is automatically reset every T seconds. Whenever the counter is incremented, control passes to step 103 wherein the value of the counter is compared to N. If that value exceeds N, control passes to step 104, where protective action is taken by the server. Otherwise, control passes to step 105, which continues with the protocol for establishing a connection (which in the environment described above, is the sending of an ACK/SYN message).

The protective action taken in step 104 can be different for different implementations. The following presents but a number of possible implementations:

(1) All connection requests arriving after N connection requests have arrived in the interval T are refused until the interval T has expired and the counter is reset (2) Oldest connection request within the interval T for which an ACK message has not been received is terminated as each new connection request in excess of N arrives during the interval.

(3) Enter a "cautionary" period during which only some of the connection requests (after the initial N requests) are honored, and some are not.

(4) Enter a "cautionary" period during which a connection request is honored only if another connection request submitted the expected ACK message. In accordance with this approach, the value of the SYN messages counter is decremented with each arrival of an ACK message for which a SYN signal was received within the interval T.

(5) Approach (4) can be generalized by modifying step 102 to allow the SYN messages counter to be decremented with each arrival of an ACK message for which a SYN signal was received within the interval T.

(6) Analyze the IP addresses of the requests to identify the source of the flooding requests. For example, the analysis may conclude that IP addresses that have consecutive numbers (e.g. 128.29.161, 128.29.162, 128.29.163 . . . ) are likely coming from a hacker, and should be disregarded.

(7) Inform NCC 50 that it is under attack, identifying its own IP address. NCC 50 can then take action to determine the source of attack. This can be effected by executing a process within one or more of the network devices (implementing the function of a router) within network 100 to identify the source of SYN messages having a destination address of the server under attack. The process executed in such a network device can be almost identical to the process depicted in FIG. 3, with the only change being in step 101, where the trigger is not whether a SYN message has arrived but, rather, whether a SYN message with a specific destination IP address has arrived. For example, when the server under attack is server 22 and the hacker is client 15, when server 22 informs NCC 50 of the attack, NCC 50 can direct network device 44 to execute the (modified) FIG. 3 process, with the destination IP address under scrutiny being the IP address of server 22. When network device 44 determines that, indeed, there is an excessive number of incoming SYN messages with a destination address being the IP address of server 22, the protective action that network device 44 takes is inform NCC 50 of the incoming port from which the flood of SYN messages is arriving. In response to this information, NCC 50 then directs another network device to perform the (modified) FIG. 3 process; e.g., network device 45. Like network device 44, network device 45 informs NCC 50 of the port from which the flood of incoming SYN messages is arriving (with a destination address being the IP address of server 22) and, thus, NCC 50 can identify the device that is doing the attacking.

Another example could be that the NCC directs all network devices to block all traffic bound for the server under attack. This could be based on the IP address of the server. This method prevents the network becoming congested.

In the FIG. 1 arrangement, clients 11-16 are connected directly to network devices. However, it should be understood that, in many instances, client computers like clients 11-16 are connected to Internet service providers (ISPs), in which case NCC 50 would identify the offending ISP, rather than the offending client.

The above disclosed the principles of this invention by way of example, but it should be understood that the presentation is merely expository and illustrative of the disclosed principles, and that various modifications and additions can be incorporated without departing from the spirit and scope of this invention. For example, it should be realized that while the above-discussed number N corresponds to a number of connection requests that are not expected to be exceeded within the preselected period T, a larger number of requests, M, can be handled by a server before its performance is significantly affected. This number can be incorporated in the protective action that step 104 takes. To give another example, while the above-disclosed method resets the SYN message counter every T seconds, it is possible to employ a "sliding widow" of T seconds, which slides with time, always looking a distance of T seconds, and closing old connection requests for which an ACK message was not received within the T seconds of the window.

The above disclosure is presented with reference to the three-message protocol that consists of the SYN, the SYN/ACK, and the ACK messages. It should be realized however, that the principles disclosed herein are applicable to any protocol when resources are occupied in a server following a first messages, and a second message is expected before those resources are released.

The invention claimed is:

1. A method carried out in a telecommunication network which includes the steps of (a) receiving at an apparatus a packet that forms a first-type message and which includes a source IP address, (b) responsive to the receiving of a first-type message sending a packet that forms a second-type message to said source IP address (c) receiving a packet that forms a third-type message in response to said sending, the improvement comprising:

incrementing a count, without regard to source IP addresses, of each second-type message that is sent out and decrementing said count, without regard to source IP address, of each third-type message that is received and which is responsive to a sent second-type message that incremented said count, said count being reset every preselected time interval T;

with each of said incrementing, determining whether said count is greater than N, where N is a number of said first-type messages that can be received within T where N is chosen to yield a selected probability level for with a conclusion that receiving fewer than N first-type messages within T is a reception of bona fide messages; and taking corrective action when said step of determining concludes that said count is N.

2. The method of claim 1 where said N is determined, for said preselected probability level, based on a previously derived probability distribution that reflects probability that N bona fide first-type messages might arrive within a said preselected time interval.

3. The method of claim 1 where said corrective action comprises forcing a release of a resource employed by a first-type message received prior to said receiving of a packet that forms a first-type message.

\* \* \* \* \*